United States Patent [19]

Pascouet

[11] Patent Number: 4,594,697
[45] Date of Patent: Jun. 10, 1986

[54] PNEUMATICALLY-OPERATED LIQUID SLUG PROJECTOR APPARATUS

[76] Inventor: Adrien P. Pascouet, 1854 S. Gessner, Houston, Tex. 77063

[21] Appl. No.: 498,013

[22] Filed: May 25, 1983

[51] Int. Cl.⁴ .......................... G01V 1/14; G01V 1/38
[52] U.S. Cl. ................................ 367/146; 367/144; 124/71; 181/118; 181/120
[58] Field of Search ................ 367/146, 144; 181/115, 181/118, 120; 124/71

[56] References Cited

U.S. PATENT DOCUMENTS

| 4,185,714 | 1/1980 | Pascouet et al. | 367/146 |
| 4,240,518 | 12/1980 | Chelminshu | 367/144 |
| 4,303,141 | 12/1981 | Pascouet | 367/146 |
| 4,364,446 | 12/1982 | Thomas et al. | 367/144 |
| 4,503,929 | 3/1985 | Farris et al. | 367/144 |

FOREIGN PATENT DOCUMENTS

| 2308112 | 11/1976 | France | 367/146 |
| 2388284 | 4/1977 | France | 367/146 |
| 0651281 | 5/1979 | U.S.S.R. | 181/120 |

OTHER PUBLICATIONS

Newman, "Water Gun Fills Marine Seismic Gap", 8/7/78, pp. 138, 140, 143–144, 146, 150, Oil & Gas Journal, vol. 76, #32.

*Primary Examiner*—Nelson Moskowitz
*Attorney, Agent, or Firm*—Michael P. Breston

[57] ABSTRACT

The liquid slug projector apparatus is entirely pneumatically operated. It comprises a generator having a main housing whose main port fluidly communicates with a liquid body. A first shuttle and a second shuttle are slidably mounted inside the main housing. The first shuttle forms with the main housing a slug chamber for confining therein a liquid slug. A pneumatic source together with a pneumatically-operated valve cyclically cause the shuttles to move relative to or in locked condition with each other, thereby applying during each cycle of operation an abrupt propulsion force to the confined liquid slug which becomes expelled as a very high-velocity liquid jet through the main port.

8 Claims, 6 Drawing Figures

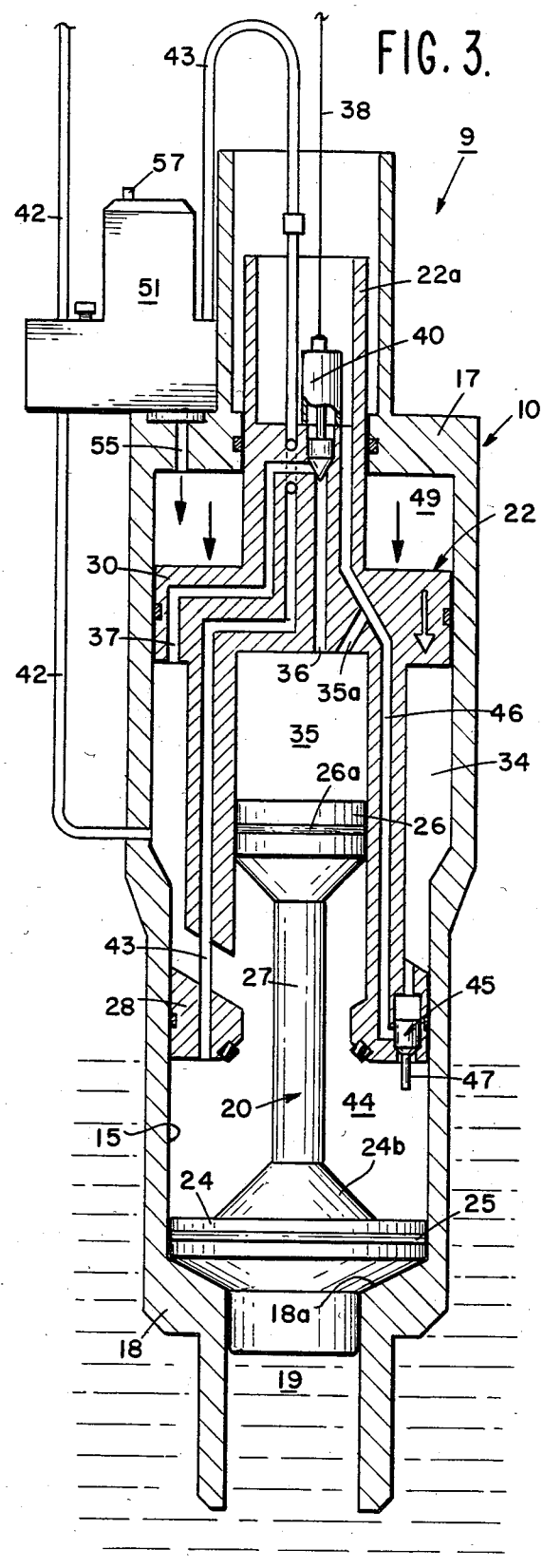
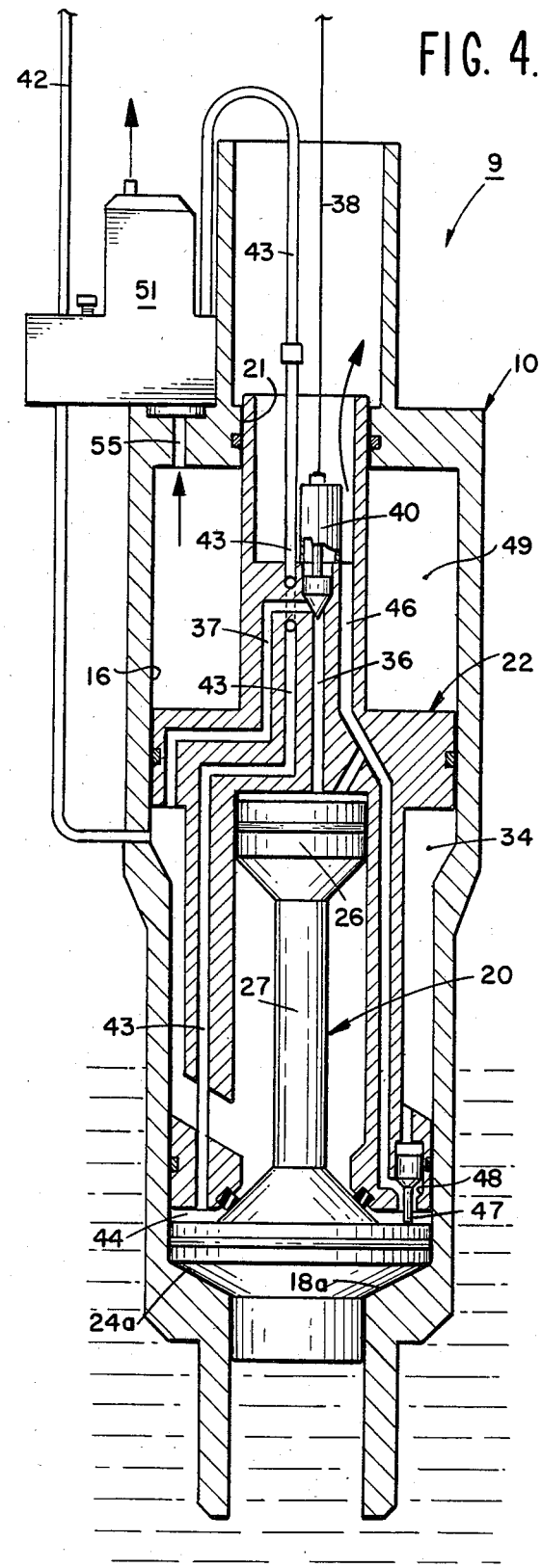

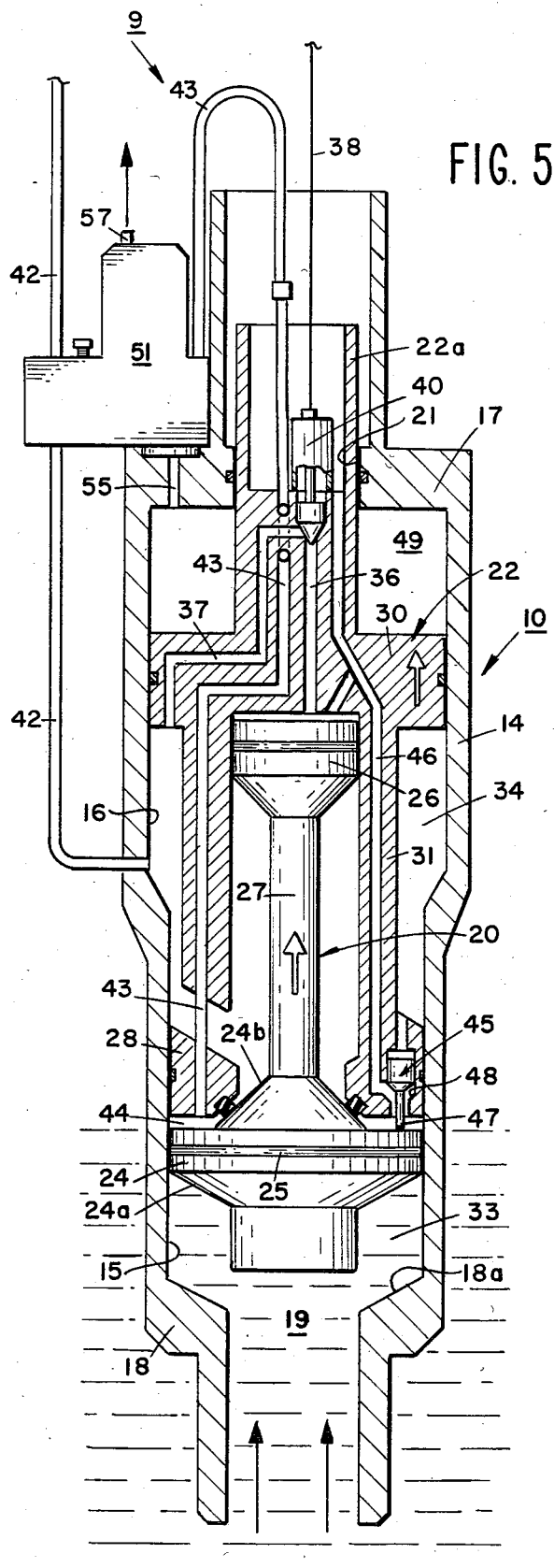
FIG. 5.
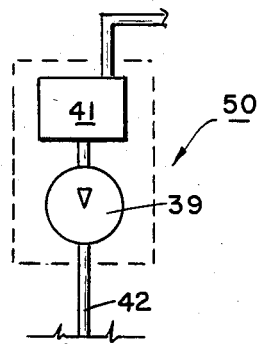
FIG. 6.
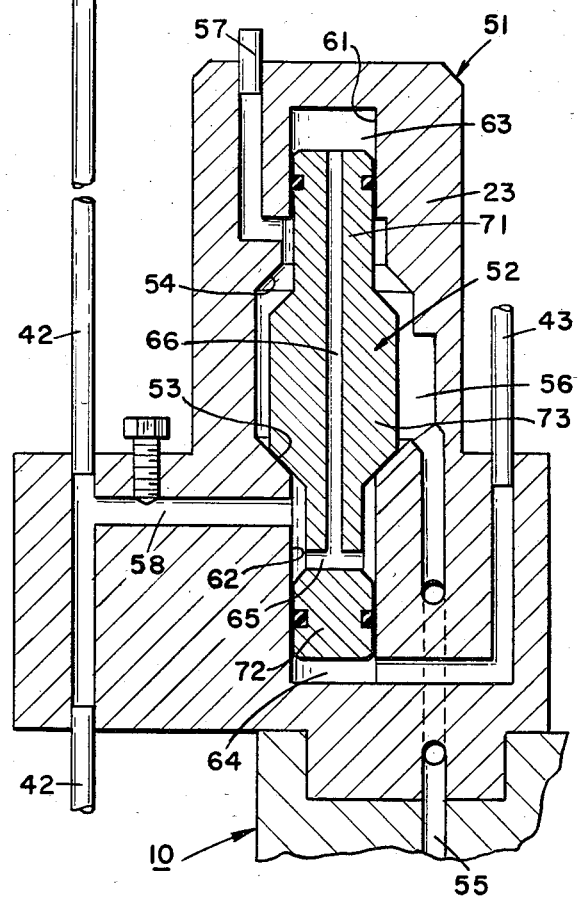

PNEUMATICALLY-OPERATED LIQUID SLUG PROJECTOR APPARATUS

BACKGROUND OF THE INVENTION

1. Field of the Invention

This invention generally relates to water guns for producing in a body of water acoustic impulses which are useful, for example, for seismic exploration, and more particularly to such water guns that are operated exclusively by pneumatic means.

2. Description of the Prior Art

Generators for producing in water acoustic impulses are already known - see for example, U.S. Pat. Nos. 3,369,627, 3,642,090, 3,642,089, 3,711,824, 4,131,178, 4,185,714, 4,303,141 and French Pat. Nos. 2,307,999 and 2,308,112.

In U.S. Pat. No. 4,303,141 there is already described a liquid slug projector apparatus which comprises a generator having a housing whose bottom wall defines a main port adapted to be submerged in a liquid body for generating acoustic energy therein. The housing has a single bore forming a larger-diameter bore portion and a smaller-diameter bore portion. First and second shuttles are slidably mounted inside the generator's housing. The first shuttle forms with the housing a slug chamber for confining therein a liquid slug. The first shuttle is slidably mounted in the smaller-diameter bore portion, and the second shuttle is slidably mounted in the larger-diameter bore portion. Hydraulic and pneumatic means are operatively coupled to the generator's housing to cause the shuttles, during one complete cycle of operation, to move both separately from each other and in locked condition with each other. During each cycle, the first shuttle applies an abrupt propulsion force to the confined liquid slug which becomes expelled as a liquid jet through the main port in the bottom wall of the housing. The pneumatic means are adapted for (1) locking and maintaining the first and second shuttles in a rest position, (2) abruptly releasing the first shuttle from the second shuttle, and (3) propelling the first shuttle toward the main port in the housing's bottom wall, thereby expelling the liquid slug into the outside liquid body. The hydraulic means are adapted for moving the second shuttle toward the first shuttle. Thereafter, the pneumatic means return the thusly locked first and second shuttles to their initial or rest position, thereby completing a full cycle of operation.

It is a main object of the present invention to provide an acoustic generator which can be operated entirely pneumatically.

SUMMARY OF THE INVENTION

The liquid slug projector apparatus includes a generator having a housing defining a larger-diameter bore portion, a smaller-diameter bore portion, and a bottom main port adapted to be submerged in a liquid body for generating acoustic energy therein. First and second shuttles are slidably mounted inside the bores of the housing. The first shuttle forms with the main housing a slug chamber for confining therein a liquid slug. The first shuttle is slidably mounted in the smaller-diameter bore portion, and the second shuttle is slidably mounted in the larger-diameter bore portion. Pneumatic force-producing means are provided which include a source of compressed air and an air-operated valve. Both the air source and the valve are directly coupled to the internal chambers of the generator mostly through air conduits in the second shuttle for pneumatically locking and maintaining the shuttles in an initial position, for abruptly releasing the first shuttle from the second shuttle, for propelling the first shuttle toward the bottom main port, for moving the second shuttle toward and locking it with the first shuttle, and for returning the thusly locked first and second shuttles together to their initial position.

BRIEF DESCRIPTION OF THE DRAWINGS

FIG. 3 shows the second shuttle in the process of executing its forward stroke;

FIG. 4 shows the second shuttle at the very end of its forward stroke, whereat it becomes hooked to the first shuttle;

FIG. 5 shows the hooked first and second shuttles in the process of executing together their return stroke; and FIG. 6 is an enlarged sectional view of the air-operated valve and its connections with the air source and the acoustic generator.

DETAILED DESCRIPTION OF A PREFERRED EMBODIMENT

Figure 1:
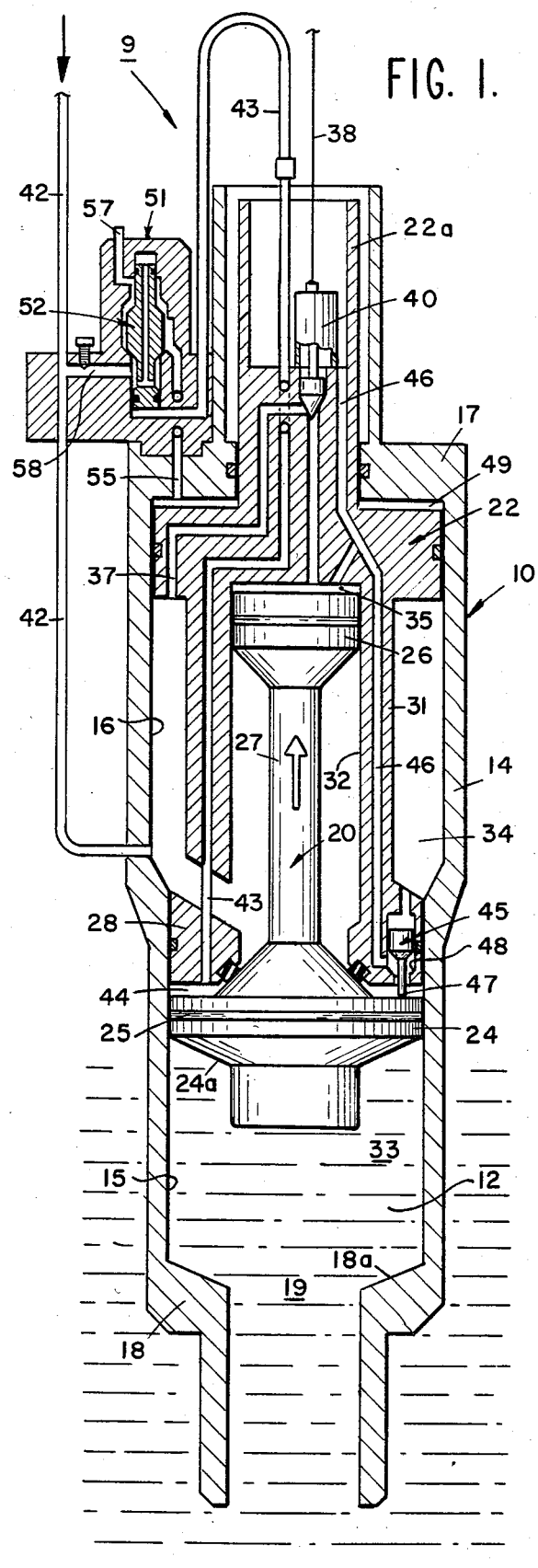
FIG. 1 shows a sectional view in elevation of a preferred embodiment of the acoustic generator; the first shuttle of the generator is shown in its ready-to-be-fired position.

The acoustic apparatus 9 (FIGS. 1-6) of this invention is entirely air operated. It includes an acoustic generator 10 which produces acoustic impulses within a surrounding liquid body 7 by expelling into the liquid body a liquid slug 12 at a very high velocity in the form of a liquid jet 8 (FIG. 2) in a downward direction 8a. Generator 10 has a cylindrical housing 14 which defines a first smaller-diameter bore 15, and a second, larger-diameter bore 16. Housing 14 has a top stop wall 17 and a bottom stop wall 18. Wall 18 defines a main port 19 which, in use, is submerged in the liquid body 7 (FIG. 1), and wall 17 defines a top port 21. Inside bores 15 and 16 are slidably mounted a first shuttle 20 and a second shuttle 22.

A pneumatic unit 50 (FIG. 6) together with a 3-way, pneumatically-operated valve 51 cyclically operate on the first and second shuttles 20 and 22 to make them move together or relative to each other, as will be subsequently described.

The first shuttle 20 comprises a first main piston 24 slidably mounted in bore 15 on a seal ring 25, a second piston 26, and an interconnecting push rod 27.

The second shuttle 22 comprises a third piston 28 defining a port 29, a fourth piston 30, and an interconnecting push rod 31 having a center bore 32. Pistons 26, 28 and 30 are slidably and sealingly mounted inside bores 32, 15 and 16, respectively.

Bore 15 defines a slug chamber 33 between wall 18 and piston 24. A main reservoir chamber 34 is defined between pistons 28, 30 and housing 14. Wall 18 and piston 28 define piston seats 18a and 28a (FIG. 2), respectively. Seats 18a and 28a have beveled surfaces which match with the tapered surfaces 24a and 24b, respectively, of piston 24. Wall 18 acts as a stop for piston 24 which, in turn, acts as a stop for piston 28.

Inside center bore 32 and above piston 26 is formed a trigger chamber 35. An internal conduit 36 leading through piston 30 to chamber 35 is connected to an internal conduit 37 leading through piston 30 to chamber 34 through a solenoid-operated valve 40 mounted within the bore of a sleeve 22a which extends upwardly from piston 30. Sleeve 22a slidably and sealingly extends through port 21. An electric line 38 periodically applies control pulses 38a to valve 40. Chamber 34 is directly connected to pneumatic unit 50 through an external fluid line 42.

A return chamber 49 is formed between piston 30 and top wall 17. Housing 14 forms a vent chamber 44 between pistons 24 and 28. Chamber 44 is connected to the pneumatic valve 51 through an internal conduit 43 which extends longitudinally through shuttle 22. When chamber 44 is reduced to its smallest volume, as shown in FIGS. 1 and 4-5, it vents to the outside medium through a normally-closed, mechanically-operated valve 45 and an internal, longitudinal vent conduit 46. Valve 45 is mounted within piston 28 and has a plunger 47 which is slidably and sealingly disposed on a valve seat 48.

With particular attention to FIG. 6, the pneumatic unit 50 has an air compressor 41 which is provided at its output with a pressure regulator 39 that is directly connected to reservoir chamber 34 through line 42.

Conduit 43 connects valve 51 with vent chamber 44. Valve 51 has a body 23 which defines bores 61, 62 and 56 in which are slidably mounted pistons 71–73, respectively, that form a shuttle 52. Pistons 71 and 72 are slidably and sealingly mounted inside bores 61 and 62, while piston 73 is slidably but not sealingly mounted inside bore or chamber 56.

Above piston 71 is defined an upper chamber 63, and below piston 72 is defined a lower chamber 64. Upper chamber 63 is continuously connected with the pneumatic unit 50 through an axial bore 66, a diametrical bore 65, conduit 58, and line 42. Lower chamber 64 is continuously connected with vent chamber 44 through line 43. Chamber 56 is continuously connected with return chamber 49 through conduit 55.

When shuttle 52 is at its lowermost position (FIGS. 1 and 6), its middle piston 73 sealingly engages a lower seat 53 and is disengaged from an upper seat 54, thereby venting return chamber 49 to the outside medium through conduit 55, chamber 56, and vent tube 57.

When shuttle 52 is at its uppermost position (FIG. 2), piston 73 sealingly engages upper seat 54 and is disengaged from lower seat 53, thereby disconnecting return chamber 49 from the outside medium and reconnecting return chamber 49 to the pneumatic unit 50 through conduit 55, chamber 56, conduit 58, and line 42. Thus, valve 51 connects return chamber 49 either with the outside medium through conduits 55 and 57, or with the pneumatic unit 50 through conduits 55, 58 and line 42.

Figure 2:
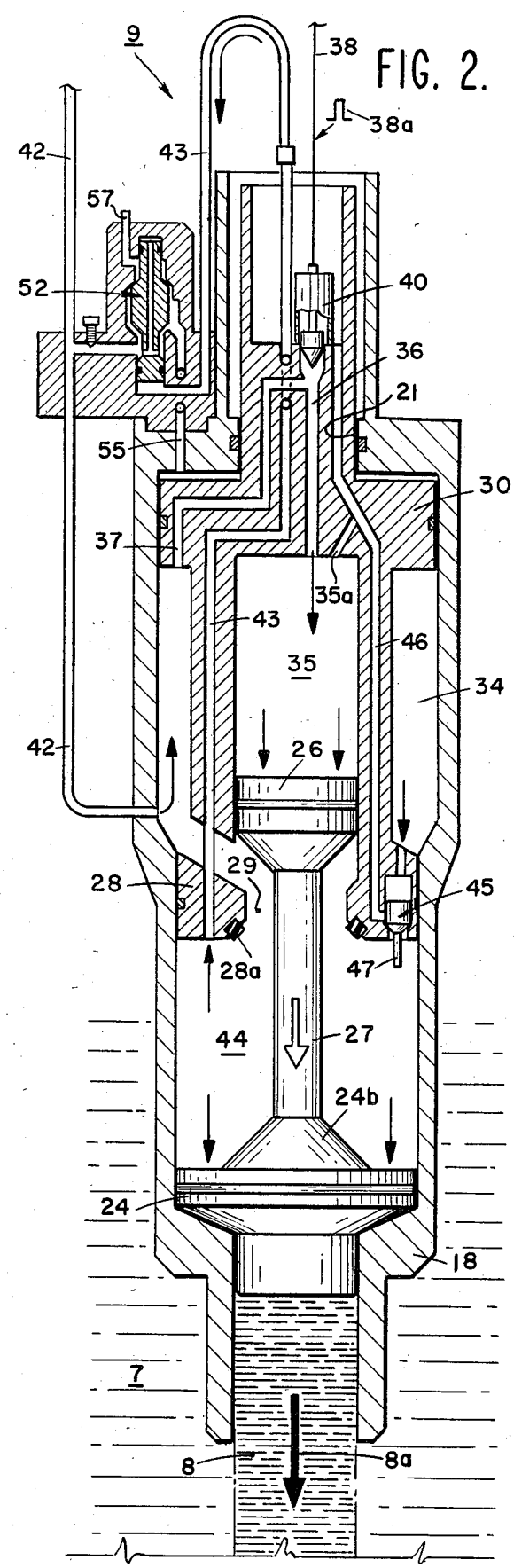
FIG. 2 shows the first shuttle at the very end of its forward stroke, at which time a liquid jet becomes ejected at a very high velocity into the surrounding body of water.

When vent chamber 44 is reduced to its lowest volume, as shown in FIGS. 1, 4 and 5, plunger 47 of valve 45 is lifted from its seat 48 to open valve 45. Then chamber 44 vents to the outside medium through valve 45 and conduit 46, and lower chamber 64 also vents to the outside medium through conduit 43, vent chamber 44, valve 45, and conduit 46. Chamber 35 continuously communicates with conduit 46 through a bleed port 35a in the upper piston 30 (FIG. 2).

To make generator 10 ready for firing, high pressure air is supplied to line 42, conduits 58, 65, 66 and chambers 34 and 63.

Shuttle 52 has sectional dimensions such that the applied pressure will push it downwardly to its lowermost position, thereby reconnecting return chamber 49 with the outside medium 11 through conduit 55, chamber 56 and vent tube 57.

BRIEF DESCRIPTION OF OPERATION OF GENERATOR 10

One complete cycle of operation of the acoustic apparatus 9 will now be described with reference to FIGS. 1-5.

The Forward Stroke of First Shuttle 20

In FIG. 1, generator 10 is shown ready to be "fired." In this condition, shuttle 52 of valve 51 is in its lowermost position. High-pressure air is contained in main reservoir chamber 34 and solenoid valve 40 is closed.

When an electric trigger pulse 38a is transmitted via line 38 (FIG. 2), valve 40 opens for the duration of the pulse to interconnect chambers 34 and 35. A downwardly-directed trigger force becomes immediately exerted against the upper face of piston 26, thereby breaking the sealing engagement between upper face 24b of piston 24 with seal 28a.

But, when piston 24 becomes disengaged from its seat 28a, the high-pressure air in chamber 34 becomes exerted against the entire surface 24b of piston 24, thereby causing shuttle 20 to become abruptly propelled downwardly. Also when shuttles 20 and 22 separate from each other, high-pressure air from chamber 34 fills chamber 44, and plunger 47 moves downwardly to close valve 45 and seal off chamber 44. After valve 45 closes, high-pressure air from chamber 34 can no longer vent to the outside medium.

As shuttle 20 completes its forward stroke, the liquid slug 12 within chamber 33 becomes expelled at a very high velocity and forms a very compressed liquid jet 8 to thereby produce acoustic energy within the body of water 7.

The Forward Stroke of Second Shuttle 22

Normally, valve 40 closes well before the end of the forward stroke of shuttle 20. Chamber 44 receives high-pressure air from chamber 34 and feeds it into lower chamber 64 of valve 51 through conduit 43. Because the sectional area of piston 72 is larger than the sectional area of piston 71, there develops an upper resultant force on shuttle 52 which moves it to its uppermost position and causes piston 73 to sealingly engage upper seat 54. Conduit 55 and chamber 56 become disconnected from vent tube 57. As a result, return chamber 49 also becomes disconnected from the outside body of water 7 and becomes reconnected to the pneumatic unit 50 through conduit 55, chamber 56, conduit 58, and line 42.

High-pressure air from compressor 41 starts pressurizing return chamber 49. The sectional areas of the second shuttle 22 are such that when the pressures within chambers 34, 44 and 49 become stabilized, there develops a downward resultant force on the second shuttle 22 (FIG. 3). As a consequence, the second shuttle 22 is pushed toward and becomes hooked to the first shuttle 20 thereby opening valve 45 (FIG. 4). When seal 28a becomes compressed by tapered surface 24b of piston 24, chamber 44 is completely vented to the outside medium through open valve 45 and conduit 46. At the same time chamber 35 continues to slowly bleed off air pressure to the outside medium through bleed port 35a in piston 30.

The Return Stroke of Locked Shuttles 20 and 22

With valve 40 closed, main reservoir chamber 34 is pressurized through line 42; with valve 45 open, vent chamber 44 and lower chamber 64 of valve 51 vent through conduit 46 to the outside medium, thereby allowing shuttle 52 to move to its lowermost position, whereat return chamber 49 becomes disconnected from pneumatic unit 50 and becomes reconnected to the outside medium.

High-pressure air contained in return chamber 49 will vent to the outside. When chamber 49 is sufficiently vented, the hooked together first and second shuttles 20 and 22 return to their uppermost position (FIG. 5), due to the difference in the surface areas of pistons 28 and 30. Generator 10 is now ready to start the next cycle of operation.

In sum, the source of compressed air 41 and the pneumatically-operated valve 51 are connected to generator 10, whereby compressor 41 continuously feeds compressed air into the main reservoir chamber 34.

The normally-closed, electrically-operated valve 40 is connected between the reservoir chamber 34 and the trigger chamber 35. When energized, valve 40 causes pressurized air from the reservoir chamber 34 to flow into the trigger chamber 35, thereby abruptly propelling the first shuttle 20 leading it to execute a forward stroke which expels the liquid slug 12 in the form of a liquid jet 8.

The pneumatically-operated valve 51 supplies compressed air from compressor 41 to return chamber 49 to cause the second shuttle 22 to move toward and lock with the first shuttle 20, thereby recompressing the air in reservoir chamber 34. The recompressed air in chamber 34 causes the locked shuttles 20, 22 to return to their initial position, thereby completing one cycle of operation.

What is claimed is:
1. A liquid slug projector apparatus, comprising:
a generator having a housing including a first bore having a bottom stop wall defining a main port;
a second bore having a top stop wall defining a top port;
a first shuttle having a first piston, a second piston, and a push rod interconnecting said first and second pistons;
a second shuttle having a third piston, a fourth piston, and
an interconnecting push rod defining a third bore therein;
said first piston being slidably mounted in said first bore;
said second piston being slidably mounted in said third bore;
said third piston being slidably mounted in said first bore;
said fourth piston being slidably mounted in said second bore;
said second shuttle having a sleeve which slidably and sealingly extends from said fourth piston through said top port;
said first bore defining a slug chamber for containing a liquid slug between said bottom stop wall and said first piston;
said second bore defining a return chamber between said fourth piston and said top stop wall;
said third bore defining with said second piston a trigger chamber;
a vent chamber formed between said first and third pistons;
a main reservoir chamber formed between said first and second shuttles and having a first inlet;
an air-operated valve having a second inlet and a valve element having two operative positions;
said first and second inlets being adapted to continuously receive compressed air from a single air line;
said compressed air maintaining said shuttles in a rest position and then abruptly releasing said first shuttle from said second shuttle, thereby abruptly expelling said confined liquid slug at a very high-velocity through said main port into said liquid body;
said valve element in one operative position supplying compressed air from said air line to said return chamber to cause said second shuttle to move toward and lock with said first shuttle; and
said valve element in another operative position venting said return chamber to the outside medium thereby causing said locked shuttles to return to their rest position.
2. The apparatus of claim 1, and
a normally-closed, electrically-operated valve connected between said reservoir chamber and said trigger chamber; and
said electric valve when energized causing pressurized air from said reservoir chamber to flow into said trigger chamber, thereby abruptly downwardly propelling said first shuttle from its rest position to execute a forward stroke which expels said liquid slug at a very high velocity through said main port into said liquid body.
3. The apparatus of claim 2, wherein
said air-operated, valve is a 3-way valve directly and rigidly connected to said return chamber.
4. The apparatus as claimed in claim 3, wherein:
said valve element is operated by the air pressure in said vent chamber and supplies compressed air from said air line to said return chamber when said vent chamber is under high pressure; and
said valve element venting said return chamber to said outside medium when said vent chamber is itself being vented to said outside medium.
5. The apparatus of claim 4, wherein
said air-operated valve is connected to said vent chamber through an air conduit having a first rigid part defined by said second shuttle, and through a second flexible part flexibly connecting said first rigid part to said air-operated valve.
6. The apparatus according to claims 1, wherein
said air-operated valve having a body and a third shuttle;
said body defining first, second, and third bores in which are slidably mounted first, second, and third pistons of said third shuttle;
said first and second pistons being slidably and sealingly mounted inside said first and second bores, and said third piston being slidably but not sealingly mounted inside said third bore;
an upper chamber situated in said body above said first piston, and a lower chamber situated below said second piston;

said upper chamber being continuously connected to said air line through bores in said third shuttle;

said lower chamber being continuously connected to said vent chamber; and said third bore being continuously connected to said return chamber.

7. The apparatus of claim 1, wherein:

said valve element is responsive to the air pressure in said vent chamber to supply compressed air to said return chamber when said vent chamber is under high pressure; and said valve element venting said return chamber to said outside medium when said vent chamber is itself being vented to said outside medium.

8. The apparatus of claim 7, wherein said 3-way valve has a control chamber which is connected to said vent chamber through a rigid air conduit defined by said second shuttle; and a flexible air conduit flexibly connecting said rigid conduit to said control chamber.

* * * * *